United States Patent [19]

Goldman

[11] 3,846,522

[45] Nov. 5, 1974

[54] FORMING OF THERMOPLASTIC POLYMERS

[75] Inventor: Conrad Goldman, Rochester, N.Y.

[73] Assignee: Elpex, Inc., Rochester, N.Y.

[22] Filed: Mar. 15, 1973

[21] Appl. No.: 341,395

Related U.S. Application Data

[63] Continuation of Ser. No. 70,958, Sept. 10, 1970, abandoned.

[52] U.S. Cl............... 264/25, 264/84, 264/126, 264/325
[51] Int. Cl............................................. B29f 5/00
[58] Field of Search ............ 264/323, 325, 126, 84, 264/25

[56] References Cited
UNITED STATES PATENTS

| | | | |
|---|---|---|---|
| 3,021,567 | 2/1962 | Ranalli | 18/55 |
| 3,192,569 | 7/1965 | Knabel | 18/42 |
| 3,413,392 | 11/1968 | Meadows | 264/102 |

*Primary Examiner*—Richard R. Kucia
*Attorney, Agent, or Firm*—Denson and Kurtzman

[57] ABSTRACT

Thermoplastic resin in comminuted form is subjected to compacting forces of magnitudes and rates, sufficient to shape an article in a retaining mold. Densities can be controlled within wide limits, by controlling the final compaction volume and force on the resin. Comminuted resin is heated, prior to forming, outside the mold, by utilizing spray-drying, fluidized-bed, infrared, dielectric heating, and others means individually or in combination, to attain the desired resin temperatures. Springback in forged plastics is minimized.

9 Claims, 13 Drawing Figures

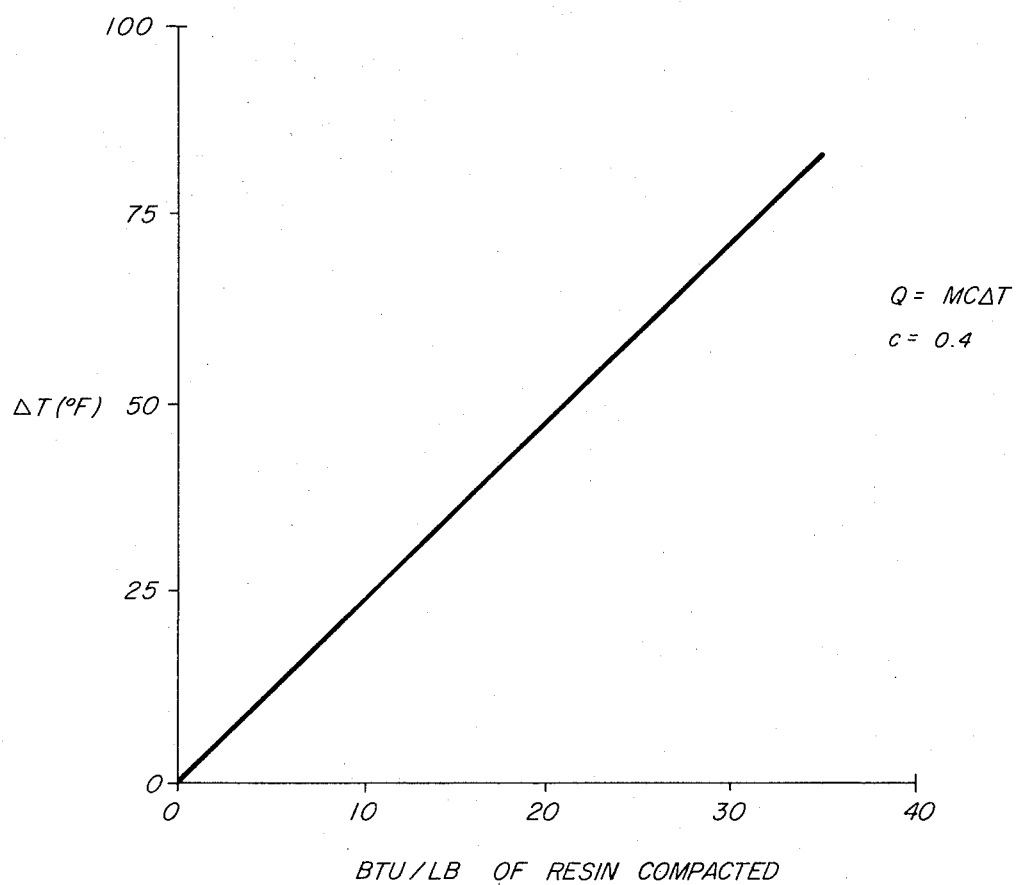
GRAPH 1

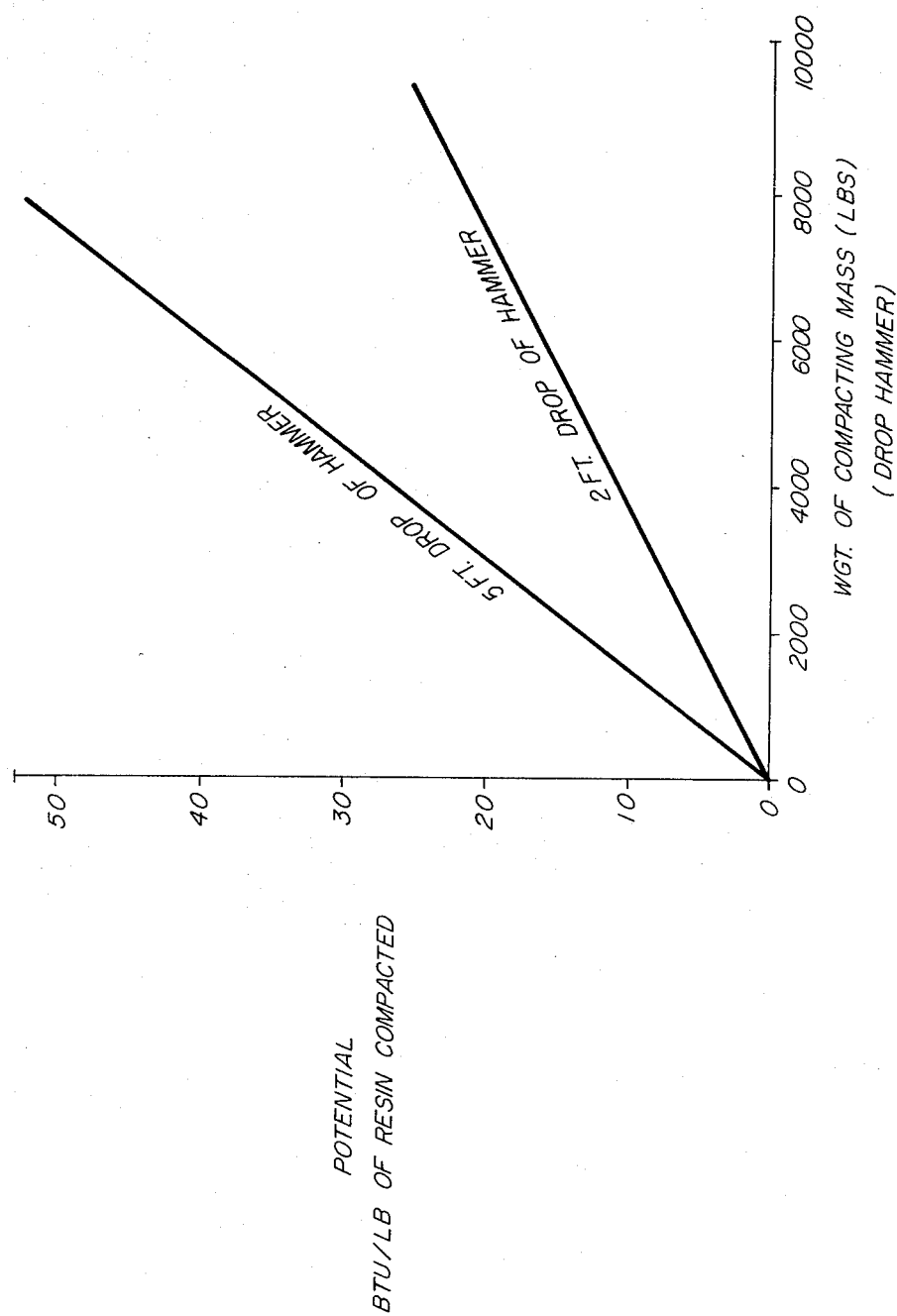
GRAPH 2

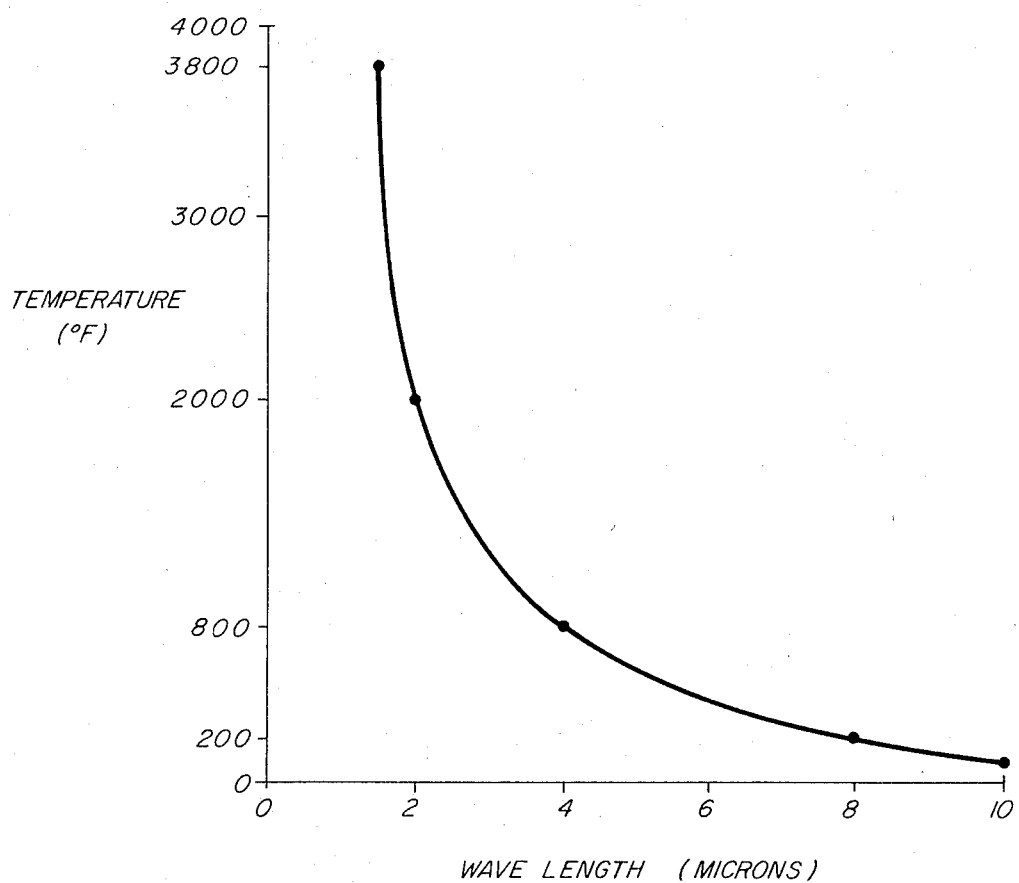
GRAPH 3

FORMING OF THERMOPLASTIC POLYMERS

This application is a continuation of my application Ser. No. 70,958, filed Sept. 10, 1970 and now abandoned.

This invention relates in general to the field of plastics processing and more particularly to methods of producing shaped articles from thermoplastic raw materials.

Efforts to produce articles of commerce from thermoplastic raw materials, utilizing metalworking equipment and techniques to convert rods, cylinders, discs, sheet material, and other solid shapes have had some success in recent years, but suffer from several disadvantages. Billets for forging plastics must first be prepared by compression molding, or by extrusion or other means. Where thicknesses are in excess of ½ inch, the time to form and cool, especially thicknesses over 2 inches, becomes excessively long in forming billets, or preforms. Heating of these thick sections, to obtain uniform temperatures require 1–2 hours or longer, in conventional ovens. Where the plastic material is Dielectrically responsive such as PVC, and the recently developed BICOLENE thermoplastic polymers, heating for 1–2 minutes or even less can produce billets sufficiently heated to be forgeable, and formable by other means.

Billets are normally produced in rod or disc shape, or other simple geometric shapes for forging, whether plastics or metal is being forged. Since the raw stock for forging metal is prepared and supplied by metal suppliers, normally steel-mills, where the molten metal is cast into ingots, then rolled and drawn etc., by the various metal-working techniques available to the steel industry, it is not unexpected that the plastic billets are currently prepared in shapes similar to those available from steel mills. The reasoning is logical, especially when considered in the light of the fact that the plastic billets are to be forged in the same equipment designs that forges metal; however, there are some pertinent differences between the metal and plastic billets that suggest they should be treated differently, and supplied in forms other than those available to date.

An object of the present invention is to process Thermoplastic resins directly from a comminuted or pellet form to a forged article in a single process.

Another object of the invention is to minimize 'springback' of the forged part, during the forging operation.

An additional object of the invention is to maximize the number of parts per hour that can be formed in a forming machine, using thermoplastic raw materials.

In the drawings:

FIG. 1 Represents a typical two piece forging die, and die holder.

FIG. 2 Indicates the various shapes produced by upset forging of metal, from rod, in a mullti-step forging process, for a typical forged part.

FIG. 3 Indicates the Forming mold, to be utilized in forming forged parts in a single step, from comminuted thermoplastic raw materials.

In designing dies for the forging of metal, by either 'upset forging' or press forging, certain rules have been formulated by the major equipment manufacturers of forging equipment, and others in the forging trades, to serve as a guide.

These rules encompass such parameters as the ratio $L/d$ of unsupported rod being forged, where L is the length and $d$ is the diameter of the unsupported member being forged. $L/d$ should not exceed 2½ for unsupported rod. For forging stock in one blow (metal) supported in a Die Impression, where $L/d$ is greater than 3, the Diameter of the Die Impression should not be more than 1½ diameters of the working stock. Also, the reduction in length being worked, should not exceed the difference between the Die Impression Diameter and the working stock diameter. Where the stock is supported in a Tool Recess, for single blow forging, a third rule applies, which in effect states that the follow relationships should exist to prevent injurious bending: - with relationship to the stock diameter $(d)$; the heading tool recess should not exceed 1½ $(d)$ at the mouth of the tool, nor 1⅛ $(d)$ at the bottom of the recess, and the length of the recess should be not less than 2/3 of the stock length, minus 2½ $(d)$.

The rules applied by the forging trade in designing dies may seem somewhat emperical, based on experience in the trade, but in any event, consideration of several important physical properties and parameters are inherently involved. These include flow properties under stress, elongation under tensile forces, deformation under compressive forces, which is a major force during forging, elastic recovery from stresses and strains imposed during the forging operation, the crystallinity or grain structure of the metal being forged, which influences one or more of the above parameters, the rate of loading the work piece with compressive forces, the temperature of the work piece, the temperature of the dies, the degree of orientation of the grains of metal imparted in the forging operation, which markedly influences the impact strength, brittleness and toughness of the forged article, the metallurgy of the metal used, and its prior history of imposed stresses and strains, hardening treatment, annealing treatment, and other factors influencing the material and processing of the work piece.

In dealing with the forging of plastics, the parameters involved in the forging of metals must also be considered, and it will be noted that differences are essentially one of degree, rather than of kind, in most cases.

Figure 4A:
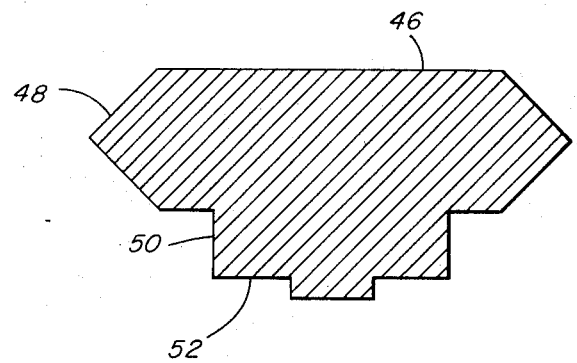
FIG. 4 Shows the shapes of a mass of resin in billet form and in forged form.
Figure 4B:
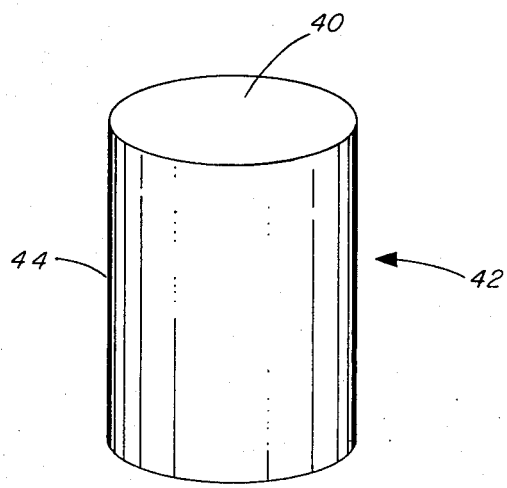

In considering the forging of a typical metal forging, such as a gear blank from a metal billet, (see FIG. 4) in a single blow, it will be seen that the material is substantially deformed, geometrically, imparting maximum orientation to the portions of metal 48 that are deformed the greatest amount. In forging of metal, the properties of the metal are such, that the heated billets, when subjected to sufficient force to cause deformation, will deform and when the deforming force is removed, the metal will retain its shape with little or no elastic recovery. The properties of most plastics differ markedly from those of metals in its elastic recovery. Being elastomeric to a substantial degree when in the temperature range somewhat below, but near the fusion point, a plastic material deformed in this temperature range and even above the fusion point, within its softening range, will have 'memory,' 'snap-back' or 'elastic recovery'; the terms being essentially interchangeable, and used by various sections of the plastics industry.

The 'elastic recovery' is of such magnitude in polypropylene, heated to 300°–325°F. that when struck by forging dies, with a contact time of one second or less, the recovery to its orginal shape approaches 100 percent, being in excess of 85 percent for most geometric shapes of billets. (See Table I)

The factors contributing to 'elastic recovery' have not been completely evaluated, from a technical point of view since they encompass many parameters which are difficult if not impossible to observe, measure and analyze. These parameters include, but are not limited to, in each plastic, (the relationships being considered separately, and in various combinations related to elastic recovery): - molecular weight, melt index, tensile strength, elongation, impact strength, brittleness temperature, orientation during the forming operation, degree of branching of the molecules of plastic, degree of cross-linking between molecules, the effect of molecular structure on the Van der Waal's forces between the molecules, the effect of molecular structure on intertwining of branch groups during orientation, the temperature of the mass at deformation, in relation to its softening range, cohesiveness of the mass prior to deformation, lubricity of the mass, the rheology of the mass related to its degree of thixotropic properties, shear strength, rate of creep under no load, rate of creep under load which in essence is a deformation rate, and other related parameters.

It will be noted that all forging of metal, and plastic, is done essentially from billets which have a density equal to or approaching the density of the finished article, that is, the billets or preforms are solid masses of material.

Figure 1A:
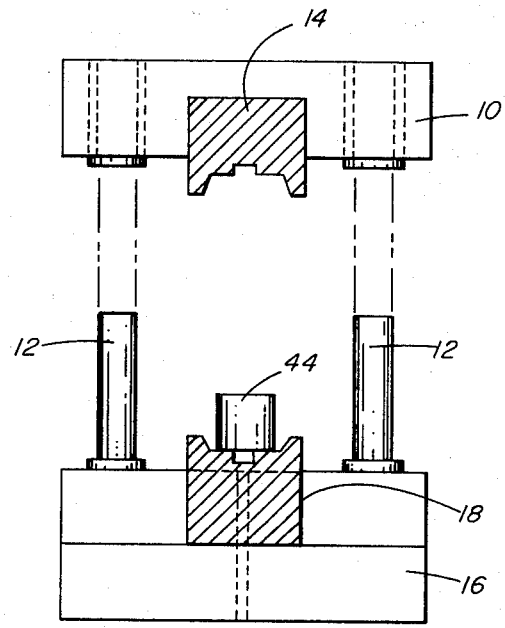
Figure 1B:
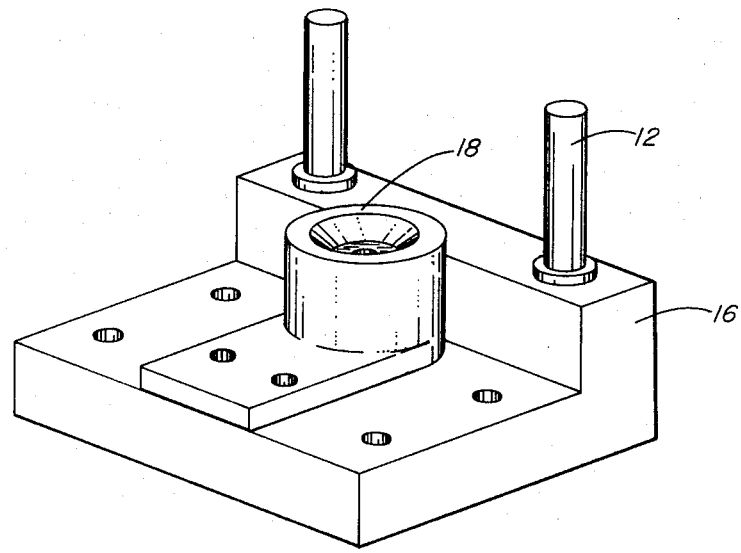
Figure 2A:
Figure 2B:
Figure 2C:
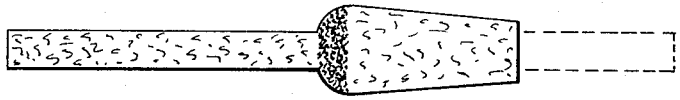
Figure 2D:
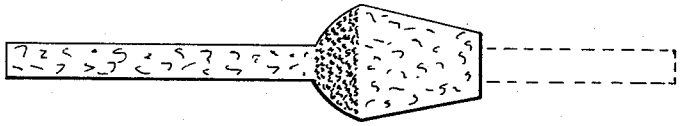
Figure 2E:
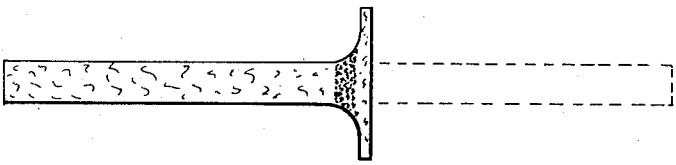
Figures 3A, 3B, 3C:
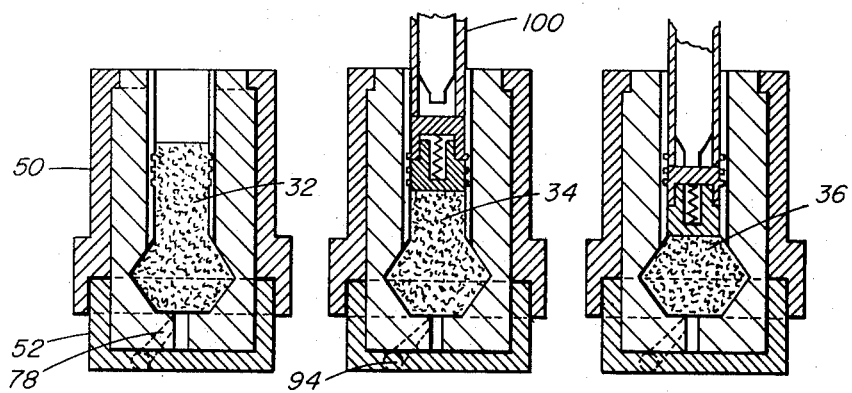

An essential step of a preferred embodiment of the invention, is to fill a specially designed mold with comminuted plastic material, of a mass equal to or slightly in excess of that required to produce the finished article. The volume of the mold cavity (See FIG. 3) is such that the volume of comminuted material 32, in the uncompressed form, can be accommodated. The material is transformed from a comminuted mass 32 to a finished product 36, while passing through essentially three distinct and critical stages, the geometry of which can be carefully controlled by design of the mold configuration and mold materials. The stages being — heated comminuted material at or slightly below the fusion point, a compacted fused billet or preform, having a volume less than the volume of the comminuted feed stock, and equal to or more than the volume of the finished article, and finally the finished product 36, at a density of the finished article, which may be fully compacted or contain voids by virtue of controlled 'compacting action.'

Considering the three distinct stages in greater detail so as to better understand the merits of the procedure.

In the comminuted form, the accumulated mass of heated particles does not have sufficient cohesive force, due to the relatively small surface contact, to present substantial resistance to flow, so that the force required to compress the mass of particles is relatively low compared to the force required to deform a preformed billet. Since the cohesive forces between the particles is low, before compaction, and since 'snap-back,' 'recovery,' or 'elastic memory' is closely associated with the Van der Waal's forces, or cohesive forces inherent in the mass, before deformation, deformation of a mass from a comminuted form to a compacted form will incur very little 'recovery' or 'snap-back' compared to a mass being deformed from one solid geometric configuration, to another, as normally experienced in conventional cold-forming operations, including forging.

By controlling the ram motion 100 (FIG. 3B) relative to the die, the volume of resin displaced can be controlled. The design of the die, particularly in respect to the ram stroke and diameter must be carefully considered in calculating degree of compaction obtained. The bulk density of the comminuted mass must be known, as well as the specific gravity, or density of the solid resin, so as to consider and control the compaction obtained. Control of compaction is a highly desirable attribute of the present plastic forming process. The density of comminuted plastic varies from about 25 percent to 50 percent of the density of solid plastic, of any one type. Spheroids, prepared by suspension polymerization have a density of about 52 percent compared to the solid resin, whereas granular particles have a density of about 35 percent of the solid mass. The finer the particle size, the lower the bulk density, especially if the resin has been screened, producing electrostatic charges which tend to keep the particles separated, by repulsion of the charged particles.

The final product may be fully compacted to 100 percent of the resin density, or it may be compacted only a sufficient amount to obtain physical integrity of the mass, producing articles having densities of 50 percent and less, compared to the solid resin being used. This aspect of the present invention has value in the field of furniture, and building products. Density is controlled in the present invention by compaction control during the forming operation; whereas present procedures practiced in the plastics industry employ the use of expandable polymers to obtain densities below that of the solid resin. Expanded thermoplastics may be produced by fluxing the resin in the presence of compressed or liquified nitrogen or other volatile, insoluble components under pressure, followed by release of pressure; however, this entails the use of special equipment, or a premium priced resin, or both. The present invention does not exclude the compaction of expanded polymers in comminuted form, to produce useful articles of commerce, particularly for use in the building products trades, or furniture trades. The expanded polymers may be produced by impregnating thermoplastic resins with volatile liquids, which are essentially non solvents for the resin as taught by Staudinger, U.S. Pat. No. 2,442,940 and Aldershot, U.S. Pat. No. 2,387,730 etc. Where particles finer than large beads are desired, comminution of pre-expanded beads having densities between 5 and 50 percent of the polymer in solid form may be employed. Density may be controlled, by controlling the content of the blowing agent, time of exposure to the expanding media, whether steam, infra red, or other means, and the resin temperature of material being subjected to expansion. Extruded low density material may be comminuted for use in the present invention; extrusion of low density resin being essentiallly taught in Jacobs, U.S. Pat. No. 3,151,192.

The preparation of the resin for the compaction and molding operation is an independent operation to the actual forming of the product. Any of the various techniques for producing finely divided or comminuted resins suitable for 'compaction forming' may be employed. These include spray drying of polymers prepared by emulsion polymerization, washing and drying by vibrating screen of suspension polymers; comminuting mass polymerized resins; extruding and pelletizing thermoplastic resins made by mass, solvent, suspension or emulsion techniques. Where colorants, antioxidants and other additives are desired, material may be prepared for 'compaction-forming' by dry-blending techniques, using ribbon blenders, tumble blending of various types, or intensive mixers. Where dry blending is insufficient to produce adequate color dispersion, more intensive blending can be obtained using extruders or intensive mixers of the Banbury or KO-Kneader variety, as well as Sigma blade intensive mixers and other types of intensive mixers, including those suitable for dry blending of powders. Homopolymers, copolymers, and blends may be dry blended, or fluxed and pelletized into small sized pellets. Similarly, latices may be spray-dried or other-wise processed, from homopolymer, copolymer, and blended material. In some instances, powder, from latex or other polymerization techniques may be pelleted into somewhat larger geometric shapes, for reasons of handling, or novel effects.

The resin in most cases, is presented to the mold chamber in heated form, either above or below the fusion temperature of the resin. Techniques for heating the resin are an independent consideration to the molding operation, and include the use of oven heating, where the ovens are the circulating hot gas type, infrared ovens, either bulb, tubular, rod, or gas fired types; dielectric heating units, either fixed plate, or stray field types at Radio frequency or microwave frequency ranges; fluidized bed heating; rotary kiln type heaters. With fine powders, prepared by spray drying, the hot dried material may be used directly, where the drying unit is of the capacity rating similar to the consumption demands of a large plant, using 'compaction technology.'

Fine particle size suspension polymer, may be removed from the reaction mass hot, rinsed with hot liquid and dried by various means in the hot state, to give a material suitable for compaction molding. Mass polymerized materials, produced on a continuous basis, may be pelletized by 'hot-melt' pelletizers directly, or they may be pelletized in the more conventional manner of chopping strands after they have been solidified by cooling.

In most cases, the consumer's demands are such, that he must purchase material from a supplier at some source removed from the molding plant, hence the material will in general, be heated from ambient temperatures, to the molding temperature.

In a preferred embodiment of the invention, the comminuted material will be heated dielectrically or by other means, to a point sufficiently below the fusion point to prevent agglomeration — will then be dry blended briefly in the free flowing state, to ensure a uniform temperature throughout the mass, and will then be transferred to the mold cavity, where compaction will be performed. Where the mass of the resin is small, compared to the mass of metal compacting the resin in a single blow of impacting force, the Kinetic energy of the moving mass of metal, being equal to one half the mass of the metal times the velocity to the second power (in feet per second) will be of such magnitude, if the velocity of impact is sufficiently high, to increase the temperature of the resin mass above its blocking point, or fusion point, causing fusing of the individual particles, to a uniform, solid mass. Since the compaction process starts with fine particles having no residual stresses, the compacted, fused mass will have no springback, or elastic recovery. The mold should be cool enough to provide for rapid ejection of the 'compaction-formed' part, but not so cool as to chill the surface prior to compacting the mass to a smooth-finished article. Using this technique of forming articles, of heavy cross section, parts can be produced substantially faster than known methods of production of comparable parts, such as by injection molding, or warm-forming - utilizing billets as raw material, and metal working machinery to process the resin to a finished article of commerce.

Graph 1 computed from the facts that 778 ft. lbs. of energy are equivalent to 1 BTU, and that $Q = mc\Delta t$, where Q is the energy in BTUs to heat the resin and $c$ is the specific heat of the resin (being of the order of 0.4 for many thermoplastic resins) and $\Delta t$ represents the temperature increment through which the resin is heated by absorbing kinetic energy by impact of the compacting mass, serves only as a guide to the energy requirements, and therefore the impact requirements, if kinetic energy is to be utilized to partially heat the resin through its softening range. The equipment design, the mold design, and the geometric shape of the resin compacted, and its weight, will influence the distribution of energy, converted from kinetic energy of impact to thermal energy. The portion of the energy being absorbed by the resin will vary as noted above, and can best be determined empirically, during compaction forming, noting the temperature of the resin prior to compaction, and immediately after compaction. The calculations are most readily appreciated, if a drop-forge unit is visualized, where the drop-hammer is the weight of the Compacting mass, and the calculations are based (ideally) on converting all the potential energy into impact energy, as heat. (See Graph 2). Mechanical forging equipment is more efficient in several ways. Since they operate with less impact to the foundation, and require fewer blows to forge the same piece, it can be assumed with confidence that more energy is transmitted to the work-piece (compacted mass) in mechanical forging equipment, than by other types. In mechanical forging presses, the energy transmitted to the work piece is best determined by considering the mass of the eccentric and attached components, and the velocity at impact, whereas in drop-hammer types of forging equipment, the weight of the dropping board and its distance of travel enables the potential energy to be determined readily, which is equivalent to the Kinetic energy of impact, part of which will be absorbed as heat by the mass being compacted.

In drop forging, the amount of energy imparted to the forging can be controlled, within limits in any one machine, by altering the distance through which the board is allowed to drop. Loading of the dropping board with extra weights can increase the force of impact. With mechanical forging equipment, the speed of the ram can be controlled by various means to control the impact force within a broad range of values; these include control of motorspeeds, control of gear ratios between the fly-wheel and the eccentric shaft and control of clutching action.

Impact force can be derived by methods other than standard plastic processing equipment, or standard metal working equipment.

Figure 5A:
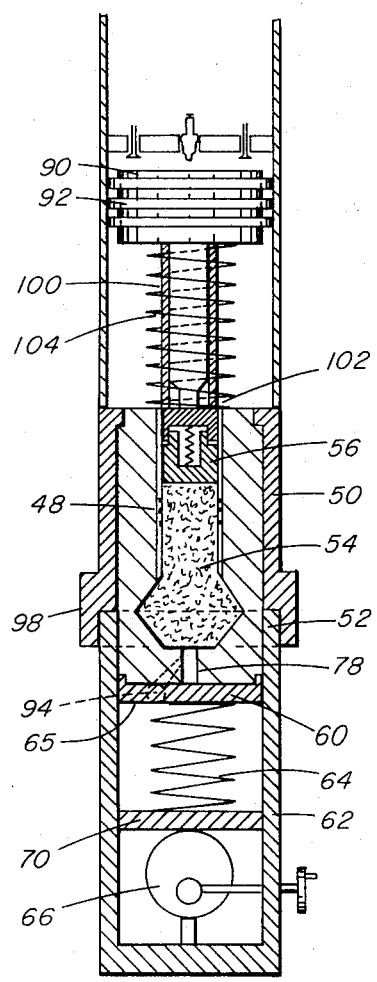
FIG. 5 Is a representation of the components of the equipment, in working relationship, of an 'explosive-forming' unit.
Figure 5B:
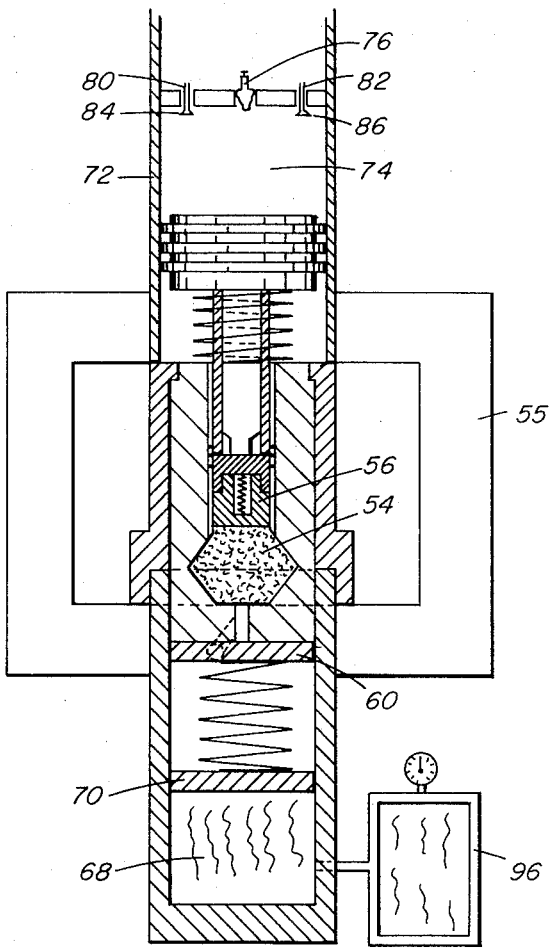

In a special embodiment of the invention, use of a modified form of 'explosive-forming' is contemplated. Referring to FIG. 5.

Figure 6:
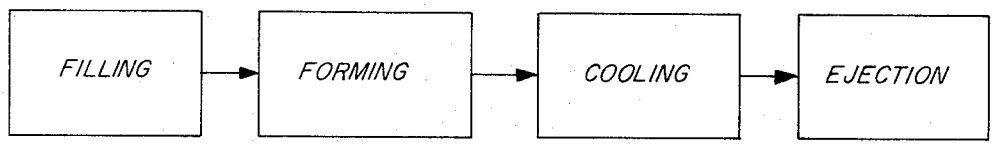
FIG. 6 Is a schematic flow diagram of the sequential steps utilized in 'Compaction-forming' of parts from comminuted material.
Figure 8:
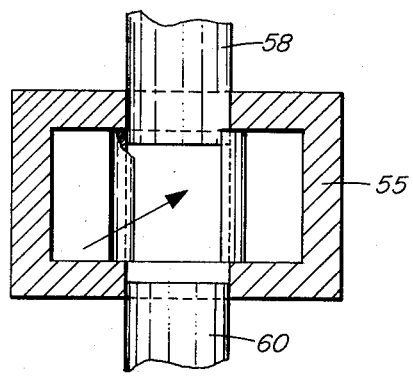
FIG. 8 Illustrates the relationship of the moving molds, to the remainder of the unit for 'explosive-forming' of plastic material.

A two piece mold 50, 52 is filled with comminuted material, 54 which has been previously heated to the desired temperature, outside the mold, as noted above, and covered with a short cylindrical 'molding cap,' 56. The closed, locked mold halves are inserted into a cylindrical chamber, 58. The locking mechanism, not shown, to keep the two mold halves together may be any standard means for joining two solid objects in alignment, capable of withstanding the pressures to which it is subjected. With cylindrical mold halves, the locking mechanism may take the form of a split ring, with nut and bolt, much as is used to affix a die to an extruder head, in the plastics industry; it may be a threaded design, as is used in pressure cookers in the average kitchen, but of sturdier design, so that a partial turn will enable the two halves to be disengaged; the 'union' in plumbing fittings, where a rotatable sleeve joins the two cylindrical segments in pressure abuttment, can be utilized, especially if the threads are transversely milled in alternating segments, so that a partial turn will disengage the two abutting components. With square or rectangular shaped molds, interlocking lugs or wedge shaped components, activated by mechanical, electrical, or fluid means, or combinations of the same, can be successfully utilized to retain the mold halves in locked alignment, while in a pressurized state. Whatever means are employed to lock the mold halves in pressurized alignment during the compaction cycle, they will have little or no effect on the overall concept disclosed, and are outside the scope of the invention; however, they should be fast-acting, to avoid unnecessary delay in opening and closing the mold, which can affect the mold cycle. The bottom half of the mold rests on a piston portion 60, contained within the lower cylindrical chamber, 62. The piston may be supported by a heavy duty spring, 64, capable of being adjusted in compressive force. The cylinder 58 is fitted with a stop 65 above the upper extremity of the lower cylinder 60 to prevent the spring from moving the piston beyond a fixed set point, in the upward direction. This assembly acts as a pressure regulating and safety device. The piston may be supported, instead, by hydraulic fluid under pressure 68, providing the same force on the lower extremity of the piston 60, as does the regulatable spring. In the upper portion of the cylinder chamber 72 is an automotive type of explosion chamber; 74 comprising a means for igniting a fuel mixture, 76, an exhaust port, 80, an inlet port, 82, equipped with valves 84, 86 respectively, and a piston head, 90 with suitable piston rings 92. The lower extremity of the piston head is fitted with a cylindrical plunger, 100 of a diameter designed to fit the mold cavity, and assume mating contact 102 with the 'molding cap' 56 resting atop the uncompressed molding powder 54. A light-duty spring 104 supports the piston head in its uppermost position, while the piston is inactive. The upper and lower piston portions are joined by any suitable structural means 55 which will keep the piston portions in alignment, and withstand the forces imposed upon the joining member. The physical structure of the joining member(s) will be such that the mold may be readily advanced into the 'forming portion' and readily removed once the resin has been formed to an integral mass. In this manner, the resin can be heated outside the forming zone of the equipment, and even outside the mold, can be rapidly formed from a comminuted state to compacted, fused mass, and moved to an ejection zone, where it is removed from the mold, immediately after forming, or after a brief cooling period, where desired, or necessary, as shown schematically in FIG. 6.

An important aspect of the present invention is related to the fact that the mold need not be retained in the press to sustain molding pressures, once the material has been formed. It can be cooled outside the press, while a separate mold is being processed. This is contrary to existing processes, where the equipment is tied up until such time as the material is ready to be ejected, whether the process is injection molding, compression or transfer molding, or forging, or related plastic processing techniques.

Referring to FIG. 9: - The molding cap has an upper 57 and lower 58 portion, retained in normally separated relationship 151, by the action of a spring 150, when not in use. After the resin is inserted in the locked mold the cap is placed atop the resin.

The plunger 100, with slidable sleeve 156 is lowered into the mold cavity. With the sleeve extended outwardly, the tapered extremeties 157 will engage with the plunger catch pins 140, releasing the butterfly locking arms from contact with the mold wall surface grooves. As the plunger is further introduced into the mold cavity, the lower extremity 152 of the plunger 100 will mate in abutting contact with the top 124 of the molding cap 56. The cap will act as an extension of the plunger, forcibly acting against the resin as the plunger is progressively moved into the mold cavity. The recoil spring 150 contained within the cap 56 will become compressed as the pressure rises, at the end of the compression stroke of the plunger. The butterfly locking arms 146 contain plunger catch pins 140 and a compression spring 142, held to the locking arms by spring pins 154. The butterfly locking arms are pivotly affixed to the upper cap member 57 by a butterfly locking arm pivot pin 148.

At the end of the compression stroke the plunger sleeve 156 is retracted, releasing the plunger catch pins 140 on the butterfly locking arms 146. The compression spring 142 will cause the butterfly locking arms to engage with the mold wall surface grooves. Retraction of the plunger 100 will cause the recoil spring 150 to forcibly lock the butterfly locking arms against the mold wall surface grooves, while simultaneously maintaining pressure on the resin, during cooling, etc. To simplify the description of the molding cap, only one set of butterfly locking arms is illustrated; however, in practice it is preferred to use two or more pairs, located along the axis of member 57, and radially disposed to each other. If two sets are utilized they should be 90° radially disposed, and axially separated by a whole number of grooves plus ½, i.e. 1½, 2½, 3½ etc., so that if one set of butterfly locking arms stops at a point other than a groove in the mold wall, the second set will be located to provide optimum locking, without decompression of the recoil spring 150. Similarly, with three sets of butterfly locking arms, they would preferably be radially separated by 60°, and axially disposed by 1⅓, 2⅓, 3⅓ for the 2nd set, relative to the first, and axially disposed 3⅔, 4⅔, 5⅔ etc. for the 3rd set, relative to the first.

To remove the cap, a special plunger like tool (not shown) is utilized, to first compress the cap retaining the recoil spring 150, so that the pressure of the butterfly locking arms against the mold cylinder walls may be reduced to essentially zero, whereby the butterfly locking arms are retracted, and the cap removed from the mold, mechanically, magnetically, or otherwise.

Figure 9A:
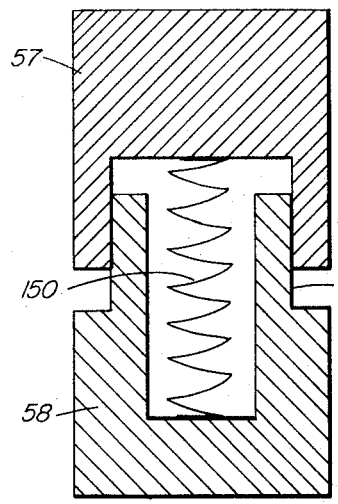
FIG. 9 Is a detailed representation of a mechanical means for retaining pressure on the resin in the mold, while the mold itself is not in a press.
Figure 9B:
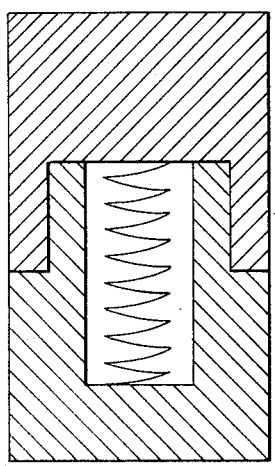
Figure 9C:
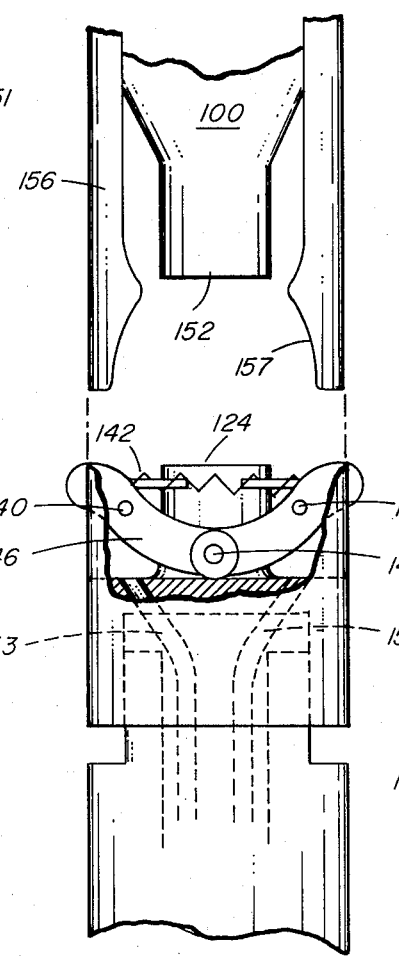
Figure 9D:
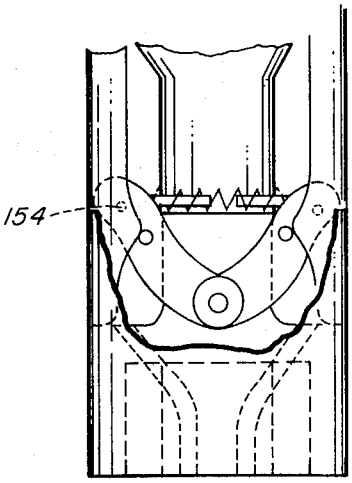
Figure 9E:
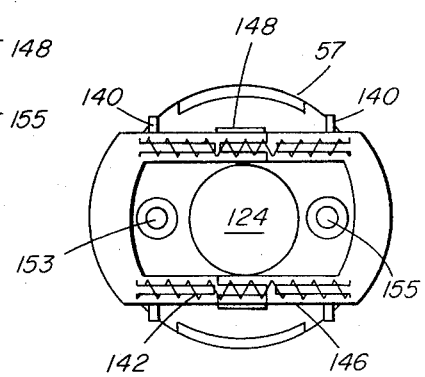

The mechanically locking molding cap described above is effective, but does not maintain constant pressure on the resin, as shrinkage of the resin occurs. A fluid operated locking molding cap may be utilized with increased effectiveness, in most cases. In place of the recoil spring, fluid under pressure is utilized. Two valves could be utilized, located in the upper portion 57 of the mold cap (FIG. 9E). Inlet valve 151 and outlet valve 153 containing suitable check valves would be used to pressurize the locked mold, once the resin had been compacted, and the molding cap butterfly locking arms were in a locked position. This is normally done immediately after the compaction cycle, outside the press, where quick disconnect hydraulic (or pneumatic) lines are utilized and pressure, at a preset level, is maintained, during the cooling cycle. Release of pressure, at the end of the cooling cycle, enables the molds to be readily unlocked and separated, to remove the molded part. The system can of course be completely automated, for high speed, high volume production. In place of the two piece molding cap, a three segment cap may be employed, with a recoil spring section in the lower segment, and a fluid section above it, to combine the advantages of both systems in a single unit.

Since the pressure exerted on the resinous material is dependent on the force exerted by the 'automotive type' of piston action, the surface area of resin under compaction, and the resisting force of the lower piston, it is relatively simple to maintain optimum molding pressures for various resins, or mold shapes, or product configurations, since the resisting force can easily be adjusted as required. In fact, the resisting spring can be supported on a cam segment 66, so that compression of the resisting spring can be altered by controlling the pressure of the spring on the cam; in this manner several different molds having different product configuations, or resins contained therein, can be formed in sequence, each under optimum conditions, dictated by a programmed setting of the spring compression, programmed to coincide with the programming of the articles being molded.

By having batch weighing programmed, temperature of resin of comminuted resin programmed, and the sequence of the molds programmed, in conjunction with the pressure control programming noted above, it is entirely feasible for a large molding plant to produce polystyrene articles, nylon articles, polypropylene articles, ABS articles, etc., in any combination and number desired, to suit the consumer demand.

Figure 7A:
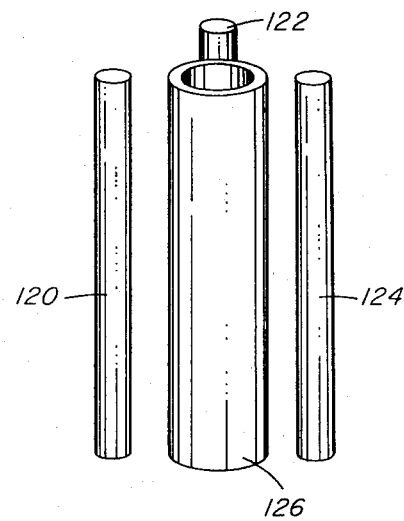
FIG. 7 Illustrates the disposition of heating elements, and comminuted resin, for heating materials while being transported in a free flowing state.
Figure 7B:
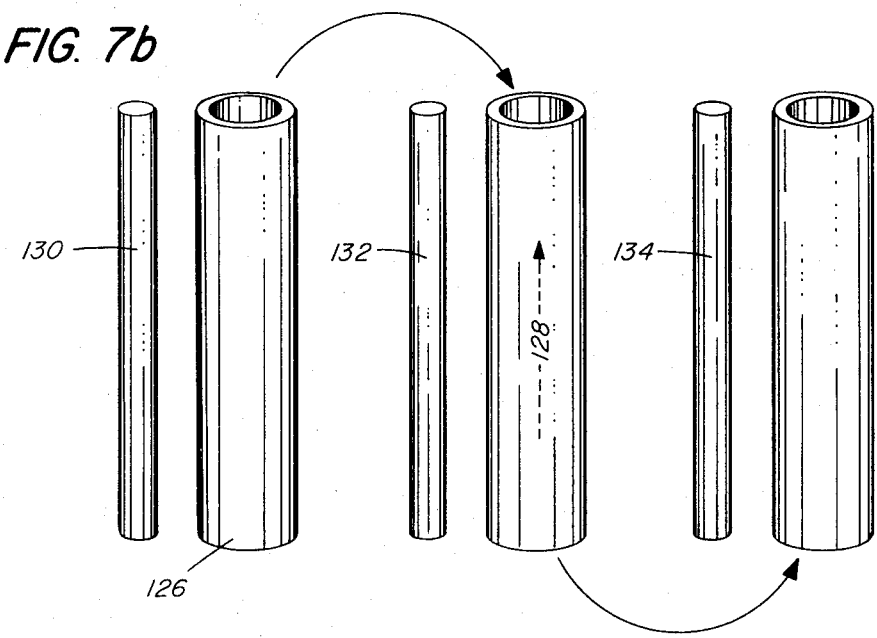
Figure 7C:
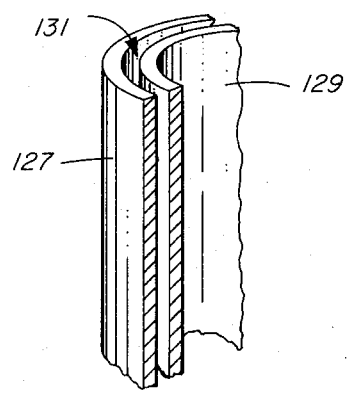

Referring to FIG. 7: - Using infra-red heating, since each resins absorbs infra-red energy in different proportions, at different wave lengths, optimum heating of comminuted resin can be achieved, for any one material, by controlling the temperatures of several heating elements, to produce the desired emission-wavelengths, conforming to the maximum absorption characteristics of the resin where the elements 120, 122, 124, are arranged around the periphery of a tube 126 transparent to the Infra-red wavelengths, conveying comminuted material 128 past the infra-red sources. The infra-red elements may be arrange individually, in series, in a cascade arrangement, 130, 132, 134 whereby the comminuted resin is first subjected to infra-red of one wavelength, then a second, and a third, etc. Heating by infra-red is essentially a surface phenomenon, followed by conduction, as well as a resonance phenomenon, wherein the impinging infra-red energy causes the molecules to absorb energy by molecular vibration, molecular-rotation and other physical phenomenon which are in resonance with the Infra-red energy, (much as piano strings vibrate when sound energy of suitable frequenceis strike a piano sounding board). The smaller the particle size of the resin being exposed to infra-red energy, the greater will be its surface area, and the greater will be the portion of the infra-red energy that is absorbed, which is dependent on surface phenomenon.

A molecule which absorbs infra-red energy at more than one frequency will absorb energy in greater quantities per unit time, if exposed to several frequencies of infra-red, rather than one frequency. This can be readily appreciated if we consider this phenomenon as being analogous to a piano, where more sound is created by activating several strings rather than just one string, whether by striking or by resonance.

The wavelength of infra-red radiation varies with the temperature of the emitting body; the higher the temperature the lower the wavelength. Four microns are emitted between 600°–800°F., while 6 microns are emitted at approximately 400°F., and 2 microns and less are emitted at about 2,000°F. and higher. See Graph No. 3.

A plot of percentage of incident infra-red energy absorbed, versus wavelength, will vary from resin to resin.

Table II indicates IR Wavelengths which are absorbed 80 percent or more by various resins noted. The wavelengths which are most readily absorbed by a resin should be chosen, for heating resins, with one or more infra-red units, for optimum heating rates.

With but slight modification to the above embodiment of the invention, similar products can be produced, utilizing equipment of less massive proportions, since Kinetic Energy will not be utilized as a significant factor in heating the resin through its critical range. In this embodiment, the resin is presented to the mold chamber at a temperature slightly above the fusion point, and sufficient pressure is applied, without the need for considering the velocity of the compacting mass, other than to provide for economical time cycles, so that the resin is compacted to its final shape, in a fused integral form. The mold temperature is maintained well below the fusion temperature of the resin so as to provide cooling of the formed article to below its fusion point, to allow for rapid ejection. The mold temperature should not be so cool as to chill the resin before it can be compacted to a uniform, smooth-surfaced article; the actual mold temperatures and resin temperatures will depend on several factors, primarily the type of resin, its thermal characteristics, including softening range, specific heat, thermal conductivity; flow characteristics, related to pressure to cause cohesive fusion at various points in the softening range; adhesiveness to the mold surface at various temperatures of the resin; the surface condition of the mold whether smooth or matte, and the mold surface material and its thermal conductivity, as well as degree of lubrication, if any.

In general, the relationship of mold temperatures, to resin temperatures of the resin being formed, can be roughly expressed in terms of the softening point of the resin, for any specific resin type. Table III lists mold and resin temperatures for some typical resins applicable to this invention; however, they are not to be considered as limiting values, since those skilled in the art are well aware of the effect of time and temperature on cooling and heating, and the combination of variables to control the cooling of molded parts is almost limitless, if the time factor is of secondary importance — while generally, the time factor is of prime importance. It is however, worth noting that compression molding of thermoplastics is done at much lower resin temperatures and lower pressures on the resin, than is injection molding. This indicates the underlying principle, that justifies the fact that compression molding is faster than injection molding, provided that heated resin is introduced to the mold. Compaction forming, being akin to compression molding, is faster than injection molding, and when explosive forming is utilized, is even faster than compression molding, since lower temperatures are used. In this case, it can be compared more with forging rates, and is faster than forging, since dwell time, to overcome elastic recovery, is minimized.

The resins may be heated by infra-red, dielectric heating, fluidized bed heating, spray drying, or other means, in comminuted form, and pressed into hot preforms, which are then, rapidly formed into solid articles by 'explosion forming' or other means.

Likewise, preforms of solid material, produced by conventional techniques, such as extrusion or compression molding may be heated and explosion formed, and cooled outside the forming zone to produce rapid cycles for molding plastic articles.

The materials being heated in communited form or solid form may be homoplymers, copolymers, or blends of resins, with mineral fillers, such as asbestos or glass, in fiber, bead or flake form; fibrous organic natural filler, such as jute, hemp, sisal cellulose fibers, wood flour, and synthetic organic fibers such as polyester, polypropylene, nylon, polyacrylonitrile, polyacrylates, etc. They may also contain micro-balloons of phenol-formaldehyde, micro-balloons of glass, or micro-balloons of carbon, as sole fillers, or in combination with fibrous fillers. Cork, low-density expanded polymers, such as rigid polyurethane, or polystyrene, in comminuted form may be incorporated to reduce the final density of the products being formed. The resins, which are adaptable to this invention include those selected from the group consisting of polyethylenes, polystyrenes, polypropylenes, cellulosic polymers, polyvinyl chloride, ethylene-vinyl acetate copolymers, polyesters, polyurethanes, polysulfones, polyamides, polyacrylates, polyacrylonitriles, styrene-butadiene copolymers, styrene-butadiene-acrylonitrile terpolymers, ABS resins. Modifications of these resins, comprising blends, copolymers, graft-polymers and heteropolymers are within the scope of this invention.

Compaction force may be obtained, in addition to the forging and 'automotive explosion forming' noted above, from hydraulic presses, used in compression and transfer molding, from hydraulic presses used in metal stamping, from hydraulic presses used in vertical injection machines, and from hydraulic presses in general, having adequate pressure and rate of application of the pressure, to form plastic parts, from plastic raw material as noted above.

The compaction force, although preferably administered in a single blow, per molding, may be administered in a multiplicity of blows, of lesser magnitude, the cumulative effect being sufficient to apply the desired amount of compaction force, at rates sufficiently rapid, to transmit the desired energy to the resin being compacted. In some cases, the energy will be utilized to impart a slight heating effect, bringing the resin from a temperature a few degrees below its fusion point, to a few degrees above its fusion point, as well as to apply the necessary molding force.

The automotive type of energy supply need not be used to impart a single blow to the molding chamber, and should preferentially be run continuously and brought into contact with the molding chamber for a multiplicity of combustion cycles, through suitable mechanical linkages — the action being likened to that of a jack-hammer; running continuously, and brought into use by contacting the material to be hammered.

The BICOLENE Resins referred to earlier as Dielectrically responsive thermoplastics, (more fully described in U.S. Pat. Application No. 792,933) are essentially resins having properties similar to the polyethylenes, the polypropylenes, and the polystyrenes, as well as other thermoplastics, with the additional advantage of being responsive to Dielectric Heating, at the various frequencies employed, including microwave frequencies.

In addition to the colorants, antioxidants, fillers, etc., that may be incorporated in the resins, that are utilized in comminuted form, cross-linking agents that are activated in the temperatures above the fusion point of the normally thermoplastic resins may be employed. When cross-linking agents are utilized, the resin, heated to slilghtly below its fusion point, prior to being admitted into the mold chamber, should be heated for sufficiently short periods of time, so as to not prematurely cross-link the resin. The heating time and temperature should be carefully related to the half-life of the catalyst system employed. Resins containing catalysts which react with reasonable speed, (less than 2 minutes), above the fusion point, an be heated by the kinetic energy of impact, during the compaction cycle especially when multiple blows are administered, per molding cycle to effectively cross-link the resin. Alternatively, the comminuted resin, in a preheated, free-flowing state, may be placed into a preheated mold, and the resin compacted in a single blow, below the cross-linking temperature of the catalyst, and the mold with its contents, removed in the closed position from the compacting unit, where it is then allowed to further heat, until cross-linked, and subsequently removed from the mold. The use of Di-CumylPeroxide as a cross-linking agent has been found useful in this application, in addition to other cross-linking systems, employed with polyethylene and other cross-linkable thermoplastics.

The method of exposing the comminuted thermoplastics to infra-red, described above, is one example of the various methods which may be employed, within the general concepts disclosed, for heating and forming compacted thermoplastics. It is recognized that infra-red wavelengths may be employed which are not absorbed 80 percent or more, and still be practical and useful in the applications noted above. Also, the relative position of the resin stream, in relation to the infra-red source, whether the infra-red is from tubular heaters, rod heaters, or gas fired infra-red heaters, directly in contact with the resin stream, or separated by an infra-red transmitting physical barrier, is considered to be within the scope of the present disclosure.

The resins that are normally sintered, from a powdered state, to produce heavy sectioned, fused parts, are particularly suited to the process outlined above. Sintering of compressed powders normally requires long time cycles, since the heat must penetrate through a material which is essentially a poor conductor of heat. In the present process, heating is done in the comminuted form, rapidly. The compaction is rapidly carried out, under conditions which both compresses the material into its final shape, and fuses it into an integral mass, in a single, rapid operation. The resins suited for compaction molding include polycarbonates, polyimides, epoxies, polyurethanes, fluorocarbons, polyesters, P-oxybenzoyl polymers, and cellulosic materials, both in the unfilled and filled forms; the fillers being fibrous, flake, bead or powder, as noted above, of the fiberglass, organic materials or mineral fillers.

While the invention has been described with reference to particular embodiments thereof, it will be understood that in its broadest aspects, the invention may be varied within the scope of the invention as set forth therein and in the appended claims.

TABLE I

Part Being Formed (Gear Blank — FIG. 4) by Forging From Billet

|  | Metal | Plastic | |
| --- | --- | --- | --- |
| Temperature | 2,000° F. | 250–350° F. | 250–300 |
| Pressure | — | 1,000–10,000 psi | 1,000–10,000 |
| Mold Contact Time | <1 Sec. | 10–15 Secs. | <1 Sec. |
| Elastic Recovery (%) | <5% | <5% | >85% |

TABLE II

| Material | Wavelengths at which absorption is 80% or more(Microns) |
| --- | --- |
| Polyvinyl chloride | 8.0 |
| Polyvinyl acetate | 8.1 |
| Polyvinyl alcohol | 9.2 |
| Polyvinyl propionate | 8.5 |
| Polyvinyl methyl ether | 8.8–9.3 |
| Polyvinyl n-butyl ether | 8.8–9.3 |
| Polyvinyl formal | 9.6–10.0 |
| Polyvinyl acetal | 8.6–9.0 |
| Polyvinylidene chloride | 9.3–9.7 |
| Polyacrylonitrile | 6.9 |
| Vinylchloride/Vinyl acetate 98:2 copolymer | (7.0;7.5;) 7.9–8.3 |
| Vinyl chloride/methyl acrylate 87:13 copolymer | 7.9–8.6 |
| Vinyl chloride/vinylidene chloride 96:4 copolymer | (7.5) 7.9–8.3; 10.2–10.6 |
| Vinyl chloride/vinylidene chloride 80:20 and 60:40 copolymer | 9.2–9.8 |
| Vinylidene chloride/vinyl chloride 87:13 copolymer | 9.3–9.8 (99% absorbed) |
| Polyvinyl acetate (partially hydrolysed | 2.8–3.15 * |
| Vinylidene chloride/ acrylonitrile 91:9 copolymer | 9.2–9.7 |
| Vinylidene chloride/ ethyl acrylate | 5.8, 8.5 9.2–9.8 |
| Polymethyl acrylate | 8.0–8.7 * 5.8; 6.9 |
| Polyethyl acrylate | 8.0–8.7 * 5.8; 6.9 |
| Polymethyl methacrylate | 8.0–9.0 * 5.8; 6.9 |
| Poly n-butyl methacrylate | 8.0–9.0; 3.4; 5.8; 6.9; 10.5 |
| Methylmethacrylate/ethyl acrylate 90:10 copolymer | 3.4; 5.8; 6.9; 8.0–9.0; 10.2 |
| Methyl methacrylate/methyl acrylate 90:10 copolymer | 3.4; 5.8; 6.9; 7.3; 8.0–9.0; 10.3; 11.8; 13.3 |
| Methyl methacrylate/styrene 80:20 copolymer | 3.4; 5.8; 6.9; 8.0–9.0; 10.2; 13.3; 14.3 |
| Methyl methacrylate/ acrylonitrile 90:10 copolymer | 3.4; 5.8; 6.9 8.0–9.0; 10.2 |

TABLE II — Continued

| Material | Wavelengths at which absorption is 80% or more (Microns) |
|---|---|
| Acrylonitrile/methyl methacrylate 55:45 copolymer | 3.4; 4.4; 5.8; 6.8; 8.0–9.0 10.2 |
| Polymethyl methacrylate-styrene/butadiene 50:50 blend (Styrene/butadiene copolymer 60:40) | 3.4; 5.8; 6.9; 8.0–9.0; 10.3; 11; 13.2; 14.3 |
| ABS rubber - polymethyl methacrylate 60:40 blend | 3.4; 5.8; 6.9; 8.0–9.0; 10.3; 13.2; 14.3 |
| Polyethylene terephthalate | 5.8; 7.2; 8.0; 9.0; 9.8; 13.8 |
| Poly (disphenylol propane) carbonate | 3.4; 5.7; 6.7; 8.–8.7; 9.3; 9.9; 11.3; 12; 13.0 |
| Urethane rubber | 5.8; 8.9 |
| Nylon 6 a-form | 3.0; 3.4; 6.1; 6.5 |
| Nylon 6 containing 3.5% caprolactam | 3.0; 3.4; 6–8.4 |
| Nylon 6:6 | 3.0;; 3.4; 6.1; 6.5 |
| Nylon 6:10 | 3.0; 3.4; 6.1; 6.5 |
| Polyacrylamide | 3.0; 5.9–6.3 |
| Polyvinyl pyrrolidone | 5.9–6.1 |
| Polythene High pressure | 3.2-3.8; 6.7-7.9; 13.3–14.2 |
| Ethylene/vinyl acetate 92:8 copolymer | 3.5; 5.8; 6.9; 7.3; 8.0–8.2 |
| Ethylene/ethyl arylate 82:18 copolymer | 3.5; 5.8; 6.8; 8.4–8.7 |
| Polythene-polyisobutene 75:25 blend | 3.4; 6.8; 8.2; 13.7–13.9 |
| Polypropylene isotactic | 3.5; 6.8; 7.3 |
| Polypropylene atactic | 3.4; 6.8; 7.3; 8.6; 10.3 |
| Polypropylene-polythene 50:50 blend | 3.4; 6.9 |
| Polypropylene-polisobutene 90:10 blend | 3.4; 6.9; 7.3; 8.6; 10.10; 10.13; 11.8 |
| Propylene/ethylene 80:20 copolymer | 3.4; 6.9; 8.7; 10.3 |
| Polystyrene | 3.4; 6.3; 6.9; 9.7; 12.9–13.5; 14.1–14.6 |
| Styrene/acrylonitrile 70:30 copolymer | 3.4; 6.9; 12.9–13.3; 14.0–14.4 |
| Polytetrafluoroethylene | 7.6–9.3; 12.6–15 |
| Polytrifluorochloroethylene | 8.4; 8.9; 10.3 |
| Polyvinylidene fluoride | 7.2; 7.9; 8.2–8.7; 11.3; |
| Polybutadiene | 3.4; 10.4 |
| Sytrene/butadiene 62:38 copolymer | 3.4; 6.9; 10.3; 13.2; 14.3 |
| Butadiene/acrylonitrile 65:35 copolymer | 3.4; 6.9; 10.1–10.4 |
| Styrene/butadiene-butadiene/acrylonitrile blend (ABS 25:10:65) | 3.4; 6.9; 13.2; 14.3 |
| Phenolic novaolak-butadiene/acrylonitrile blend | 2.9; 3.4; 6.9; 8.0–8.5; 10.3 |
| Chlorinated rubber | 6.9; 7.7–8.2; 13.3–14.0 |
| Rubber hydrochloride | 3.4; 6.8; 7.2 |
| 'Thiokol A' | 9.0–10.0 |
| Polyether urethane rubber | 8.7–9.4 |

*100% absorbed

TABLE III

| Resin Type | Deflection Temperature 66 psi °F. | Processing Temperature (Resin) °F. | Temperature Above Deflection Δt (°F.) | Processing Conditions |
|---|---|---|---|---|
| Hi Impact Polystyrene | 210 | 350–600 | 140–400 | Injection (I) |
|  | do. | 250–400 | 40–200 | Transfer (T) |
|  | do. | 250–400 | 40–200 | Compression (C) |
|  | do. | 225–250 | 0–50 | Forging (F) |
| Polypropylene | 230 | 400–550 | 170–320 | (I) |
|  | do. | 340–450 | 110–220 | (T) |
|  | do. | 340–450 | 110–220 | (C) |
|  | do. | 300–325 | 70–95 | (F) |
| Polyethylene High Density | 140–190 | 300–600 | 110–410 | (I) |
|  |  | 300–450 | 110–260 | (T) |
|  |  | 300–450 | 110–260 | (C) |
|  |  | 275–325 | 85–135 | (F) |

Note: For High Impact polystyrene, Vicat Softening temperature is about 50°–75°F. higher than the deflection temperature, while the crystalline M.P. is about 100°–125°F. higher than the deflection temperature. Other thermoplastics show similar trends. Forging is normally done at or slightly below the fusion temperature (softening range). Injection molding is done above the melting point. Compaction forming temperatures range between those of forging and those of compression molding, depending on the Kinetic Energy available.

What is claimed is:

1. A method of forming a shaped plastic article in a press comprising a removable mold which article does not obtain dimensional stability immediately after being shaped the method comprising:
   1. heating comminuted thermoplastic resin to temperatures approaching but below the point of fusion of said resin;
   2. placing the heated comminuted thermoplastic resin, which has a bulk density of 52 percent or less of the solid resin density, in a removable mold comprising an upper member and a lower member, said members in unlockable mated position, at least the upper member having a bore which allows the passage of the comminuted resin to the interior of the mold;
   3. subjecting the comminuted resin, by means of a molding cap being slidably movable in the bore, to a forging force of such magnitude and rate of application such that the kinetic energy of the forging means is converted to sufficient thermal energy thereby forming a forged article from the comminutive resin;
   4. without releasing the pressure produced by the forging force removing the mold containing the forged article from the press;
   5. allowing the forged article to reach a state of dimensional stability; and
   6. releasing the pressure and removing the stabilized, forged article from the mold.

2. A method of forming a shaped plastic article as noted in claim 1, in which the heating of the comminuted plastic resin is performed by exposing the resinous material, while being transported through a transparent conduit in a gaseous fluid, to one or more infrared wavelengths which are 80% or more absorbed by the resinous material.

3. A method of forming a shaped plastic article as in claim 1, in which the thermoplastic resin is selected from the group consisting of polyethylenes, polypropylenes, polystyrenes, polyvinyl-chlorides, ethylene-vinyl acetate copolymers, polyesters, cellulosic polymers, polyurethanes, polysulfones, polycarbonates polyamides, polyacrylates, polyacrylonitriles, styrene-butadiene copolymers, ABS resins, including copolymers, graft polymers and heteropolymers of the above resins, fluorocarbons, epoxies, polyimides.

4. A method of forming a shaped plastic article as in claim 1, in which the thermoplastic resin contains fillers selected from the group consisting of mineral fillers in powder flake or bead form, mineral fillers in fibrous form, organic fibrous fillers occuring in nature, synthetic organic fibers, comminuted expanded polymers, cork, micro balloons of glass, micro balloons of carbon and micro balloons of thermosetting resins.

5. A method of forming a shaped plastic article, as noted in claim 1, in which the forging force is provided by a modified explosive forming unit, comprising an upper portion, in mating contact with the top section of a two piece mold, and a lower portion, in mating contact with the bottom section of a two piece mold, said top section including automotive inlet and exhaust ports and valves, means for igniting fuel mixtures, a piston fitted with rings, moveable within a cylinder chamber, the bottom of said piston having a rod member extending outwardly therefrom, concentrically, and of sufficient length and diameter, to engage with a cylindrical cavity in the top half of the two piece mold, and to provide compaction force to the resin contained in the mold, when the fuel mixture is ignited; a bottom piston fitted with rings, moveable within a lower cylinder chamber, said bottom piston supporting in intimate contact the bottom portion of the two piece mold, and resting a top a controllable restricting means, which will yield axially as the compacting force exceeds a predetermined value.

6. A method of forming a shaped article as in claim 5, in which the compacting force is administered in a multiplicity of blows per molding cycle.

7. A method of forming a molded part, as noted in claim 5, in which the forging unit is brought into mating contact with the mold chamber, while the piston is moving, allowed to remain in contact with the mold member for a multiple number of strokes of the piston, until the moldable mass has been compacted to the desired degree, followed by retracting the forged unit to a position which is non mating with the mold member, and removing the mold member from the forging zone, where it may be opened, and from which may be removed, the formed and stabilized molded part.

8. A method of forming a shaped plastic article in a forging means comprising a removable mold which article does not obtain dimensional stability immediately after being shaped the method comprising the steps of:

1. heating the comminuted thermoplastic resin having a bulk density between 52 percent and 22 percent of its solid resin density;
   2. placing the heated comminuted resin in the cavity of the mold;
   3. subjecting the comminuted resin to a controlled forging force so as to densify the comminuted resin to a coherent shaped article, having a density between 20 percent and 100 percent of that of the solid resin;
   4. without releasing the pressure produced by the forging force, removing the mold from the forging means;
   5. allowing the shaped article to reach a state of dimensional stability; and
   6. releasing the pressure and removing the stabilized shaped article from the mold cavity.

9. A method of forming a shaped plastic article, in a press comprising a removable mold, which article does not obtain dimensional stability immediately after being shaped, the method comprises the steps of:
   a. heating comminuted theremoplastic resin to temperatures approaching but below the point of fusion of said resin;
   b. placing the heated comminuted thermoplastic resin, which has a bulk density of 52 percent or less of the solid resin density, in a removable mold comprising an upper member and a lower member, said members in unlockable mated position, at least the upper member having a bore which allows the passage of the comminuted resin to the interior of the mold;
   c. subjecting the comminuted resin, by means of a mold cap being slidably movable in the bore to a forging force of such magnitude and rate of application such that the kinetic energy of the forging force is converted to sufficient thermal energy thereby forming a forged article from the comminuted resin;

d. without releasing the pressure produced by the forging force, removing the mold containing the forged article from the press;

e. allowing the forged article to reach a state of dimensional stability; and f. releasing the pressure and removing the stabilized, forged article from the mold.

* * * * *